(12) United States Patent
Pickett

(10) Patent No.: US 6,572,163 B1
(45) Date of Patent: Jun. 3, 2003

(54) BUMPER PROTECTION DEVICE

(76) Inventor: Jerome Pickett, 255 Warren St., Apt 2006, Jersey City, NJ (US) 07302

(*) Notice: Subject to any disclaimer, the term of this patent is extended or adjusted under 35 U.S.C. 154(b) by 0 days.

(21) Appl. No.: 10/137,251

(22) Filed: May 2, 2002

(51) Int. Cl.[7] ............................................. B60R 13/04
(52) U.S. Cl. ..................................................... 293/142
(58) Field of Search ................................. 296/128, 142, 296/143, 144, 115; 428/31

(56) References Cited

U.S. PATENT DOCUMENTS

| | | | | |
|---|---|---|---|---|
| 2,730,396 A | * | 1/1956 | Johnson | |
| 4,014,583 A | * | 3/1977 | Forbes | |
| 4,750,767 A | * | 6/1988 | Barnett | 293/128 |
| 4,896,911 A | * | 1/1990 | Duke | 293/128 |
| 5,129,695 A | * | 7/1992 | Norman, II | 293/128 |
| 5,229,174 A | * | 7/1993 | Riead | 428/31 |
| 5,320,392 A | * | 6/1994 | Hart | 293/128 |
| 5,799,992 A | * | 9/1998 | Kojima | 293/128 |

* cited by examiner

Primary Examiner—Joseph D. Pape

(57) ABSTRACT

A bumper protection device prevents damage to the parked vehicle to which it is affixed. It accomplishes this by serving as an intimidating visual deterrent that could potentially damage any vehicle that comes into contact with the device. The bumper protection device is particularly attractive because it accommodates a wide variety of automobiles and light trucks without requiring any physical modification to the vehicle to which it is affixed and is easily removed when not in use. Avoiding vehicle damage could save a motorist a significant amount of money in professional body repairs and parts replacement.

3 Claims, 4 Drawing Sheets

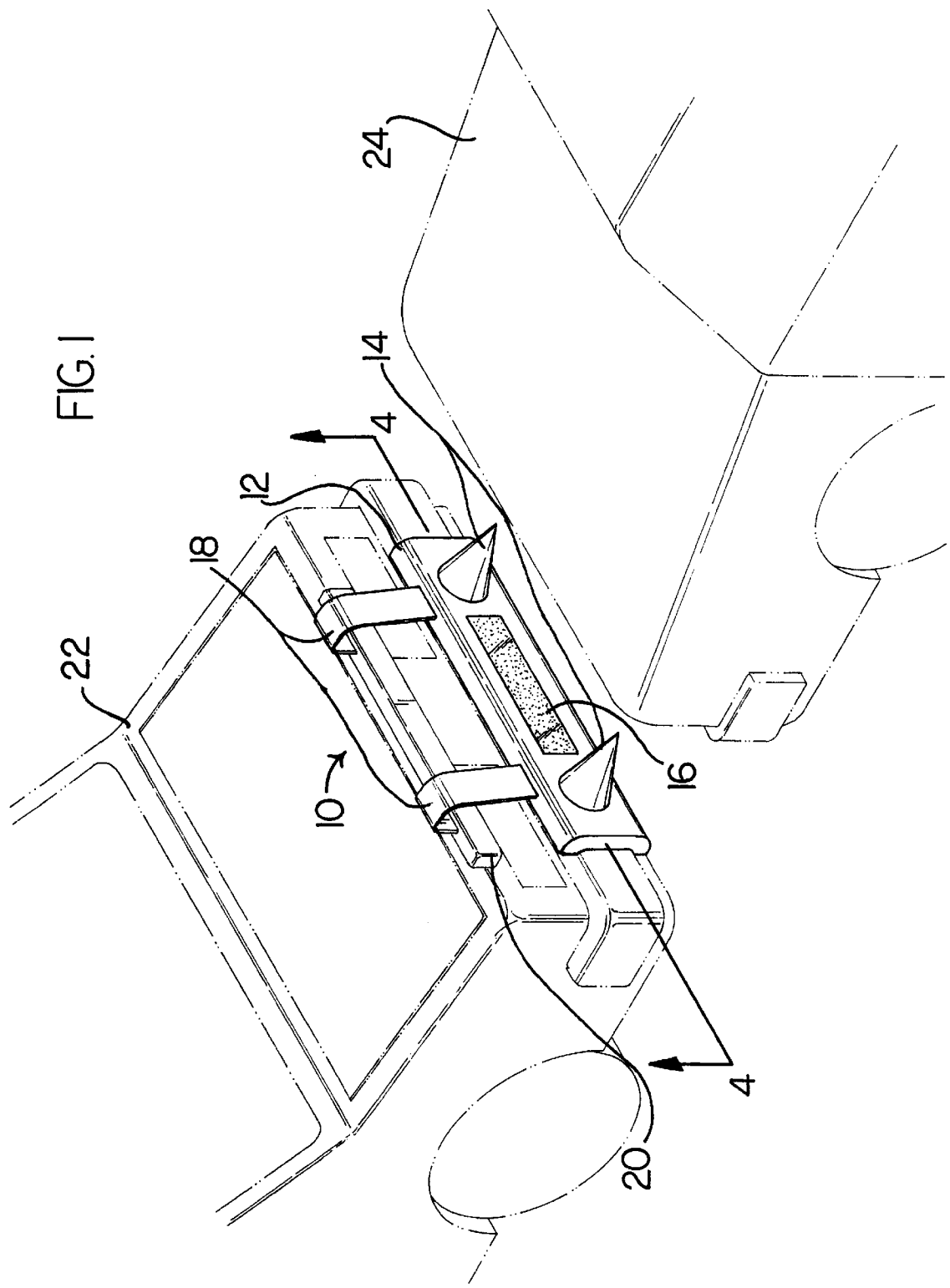

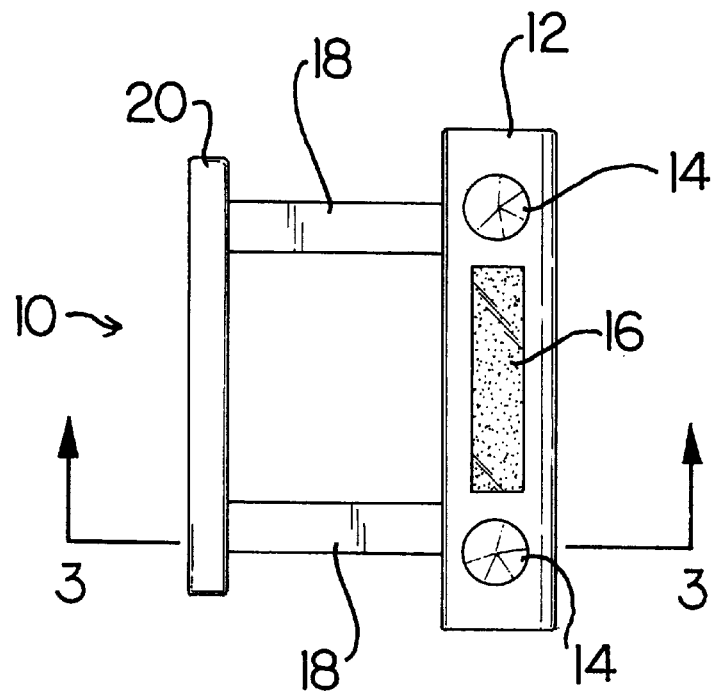
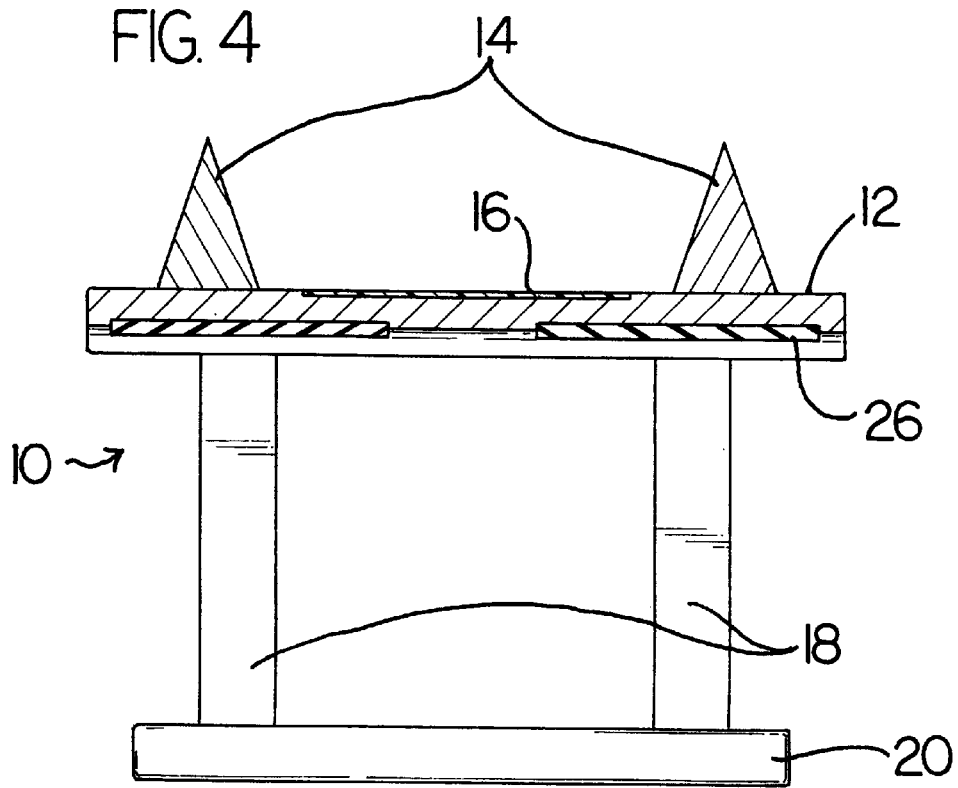

BUMPER PROTECTION DEVICE

BACKGROUND OF THE INVENTION

1. Field of the Invention

The present invention relates to a bumper protection device for use in connection with a vehicle. The bumper protection device has particular utility in connection with protecting a parked vehicle from damage caused by other vehicles attempting to park adjacent to it.

2. Description of the Prior Art

The use of bumper guards is known in the prior art. For example, U.S. Pat. No. 4,641,870 to Heyman discloses a bumper guard. However, the Heyman '870 patent does not protect the rear of the vehicle to which it is affixed, and has further drawbacks of being bolted to the automobile frame, requiring pre-existing holes and rendering removal difficult when the guard is not in use.

U.S. Pat. No. 6,113,164 to Setina discloses an auxiliary push bumper for motor vehicle that prevents damage to the vehicle when it pushes another vehicle. However, the Setina '164 patent does not protect the rear of the vehicle to which it is affixed, and additionally does not allow for easy removal of the push bumper when not in use.

Similarly, U.S. Pat. No. 2,736,287 to Moyes discloses a tailgate-supporting bumper-guard construction that provides a bumper guard that will serve as a support for the outer or free end portion of the hingedly mounted tailgate when said tailgate is in its lowered, load supporting position.. However, the Nloyes '287 patent does not protect the vehicle from damage resulting from contact with another vehicle, and can not be easily removed when not in use.

Furthermore, U.S. Pat. No. 2,203,489 to Conwell discloses a bumper guard that applies to a conventional bumper structure as an accessory device. However, the Conwell '489 patent does not protect the front of the vehicle to which is attached, and has the additional deficiency of not being easily removed when not in use.

In addition, U.S. Pat. No. 3,308,903 to Sobel et al. discloses a motor vehicle push preventing bumper guard that renders the power plant of a moving motor vehicle inoperative when coming in contact with an obstruction, such as, for example, another motor vehicle. However, the Sobel et al. '903 patent does not deter other vehicles from making contact with the vehicle to which the guard is attached, and has the additional deficiency of inactivating the power plant of the driven motor vehicle when the bumper guard comes in contact with an obstruction.

Continuing, U.S. Pat. No. Des. 259,414 to Miller discloses a motor vehicle bumper guard. However, the Miller '414 patent does not deter other vehicles from making contact with the vehicle to which the guard is attached, and cannot be removed easily when the guard is not in use.

Lastly, U.S. Pat. No. 2,083,742 to Poncher et al. discloses a bumper guard that mounts on the front and rear bumpers in a position to protect the radiator and the trunk door, respectively. However, the Poncher it al. '742 patent does not deter other vehicles from making contact with the vehicle to which the guard is attached, and has the additional deficiency of being difficult to remove when the mount is not in use.

While the above-described devices fulfill their respective, particular objectives and requirements, the aforementioned patents do not describe a bumper protection device that allows protecting a parked vehicle from damage caused by other vehicles attempting to park adjacent to it. The above patents make no provision for easily being removed from the vehicle when not in use. They also do not deter other drivers from making contact with the vehicle to which they are affixed. In addition, the Heyman '870 patent and the Poncher et al. '742 patent cannot be attached to a wide variety of vehicles.

Therefore, a need exists for a new and improved bumper protection device that can be used for protecting a parked vehicle from damage caused by other vehicles attempting to park adjacent to it. In this regard, the present invention substantially fulfills this need. In this respect, the bumper protection device according to the present invention substantially departs from the conventional concepts and designs of the prior art, and in doing so provides an apparatus primarily developed for the purpose of protecting a parked vehicle from damage caused by other vehicles attempting to park adjacent to it.

SUMMARY OF THE INVENTION

In view of the foregoing disadvantages inherent in the known types of bumper guards now present in the prior art, the present invention provides an improved bumper protection device, and overcomes the above-mentioned disadvantages and drawbacks of the prior art. As such, the general purpose of the present invention, which will be described subsequently in greater detail, is to provide a new and improved bumper protection device for protecting a parked vehicle from damage caused by other vehicles attempting to park adjacent to it which has all the advantages of the prior art mentioned heretofore and many novel features that result in a bumper protection device which is not anticipated, rendered obvious, suggested, or even implied by the prior art, either alone or in any combination thereof. To attain this, the present invention essentially comprises a base having a top surface and a bottom surface and a vehicle mount attached to said base.

There has thus been outlined, rather broadly, the more important features of the invention in order that the detailed description thereof that follows may be better understood and in order that the present contribution to the art may be better appreciated.

The invention may also include a reflective strip attached to the top surface of the base and a protective strip attached to the bottom surface of the base. Additionally, components to act as a visual deterrent to contact with the bumper protection device may be attached to the top surface of the base, such as metal spikes. The vehicle mount may take the form of an anchor with one or more straps attached to the anchor at one end and the base at the other. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bumper protection device that has all of the advantages of the prior art bumper guards and none of the disadvantages.

It is another object of the present invention to provide a new and improved bumper protection device that may be easily and efficiently manufactured and marketed.

An even further object of the present invention is to provide a new and improved bumper protection device that has a low cost of manufacture with regard to both materials and labor, and which accordingly is then susceptible of low prices of sale to the consuming public, thereby making such bumper protection device economically available to the buying public.

Still another object of the present invention is to provide a new bumper protection device that provides in the apparatuses and methods of the prior art some of the advantages thereof, while simultaneously overcoming some of the disadvantages normally associated therewith.

Even still another object of the present invention is to provide a bumper protection device for protecting a parked vehicle from damage caused by other vehicles attempting to park adjacent to it. This allows the user to easily remove the bumper protection device when it is not in use.

Still yet another object of the present invention is to provide a bumper protection device for protecting a parked vehicle from damage caused by other vehicles attempting to park adjacent to it. This makes it possible to visually deter other drivers from placing their vehicle in contact with the area of the vehicle covered by the bumper protection device.

A further object of the present invention is to provide a bumper protection device for protecting a parked vehicle from damage caused by other vehicles attempting to park adjacent to it. This enables the user to protect a wide variety of vehicles without physically modifying the vehicle to be protected.

An additional object of the present invention is to provide a bumper protection device for protecting a parked vehicle from damage caused by other vehicles attempting to park adjacent to it. This makes it possible to not damage the vehicle being protected while applying or removing the bumper protection device by employing a protective strip.

Still yet another further object of the present invention is to provide a bumper protection device for protecting a parked vehicle from damage caused by other vehicles attempting to park adjacent to it. This ensures that the bumper protection device is clearly visible during low light conditions by use of a reflective strip.

Lastly, it is an object of the present invention to provide a new and improved bumper protection device for protecting a parked vehicle from damage caused by other vehicles attempting to park adjacent to it.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front perspective sectional view of the current embodiment of the bumper protection device constructed in accordance with the principles of the present invention.

FIG. 2 is a front side view of the bumper protection device of the present invention.

FIG. 4 is a top side view of the bumper protection device of the present invention.

DESCRIPTION OF THE CURRENT EMBODIMENT

Figure 3:
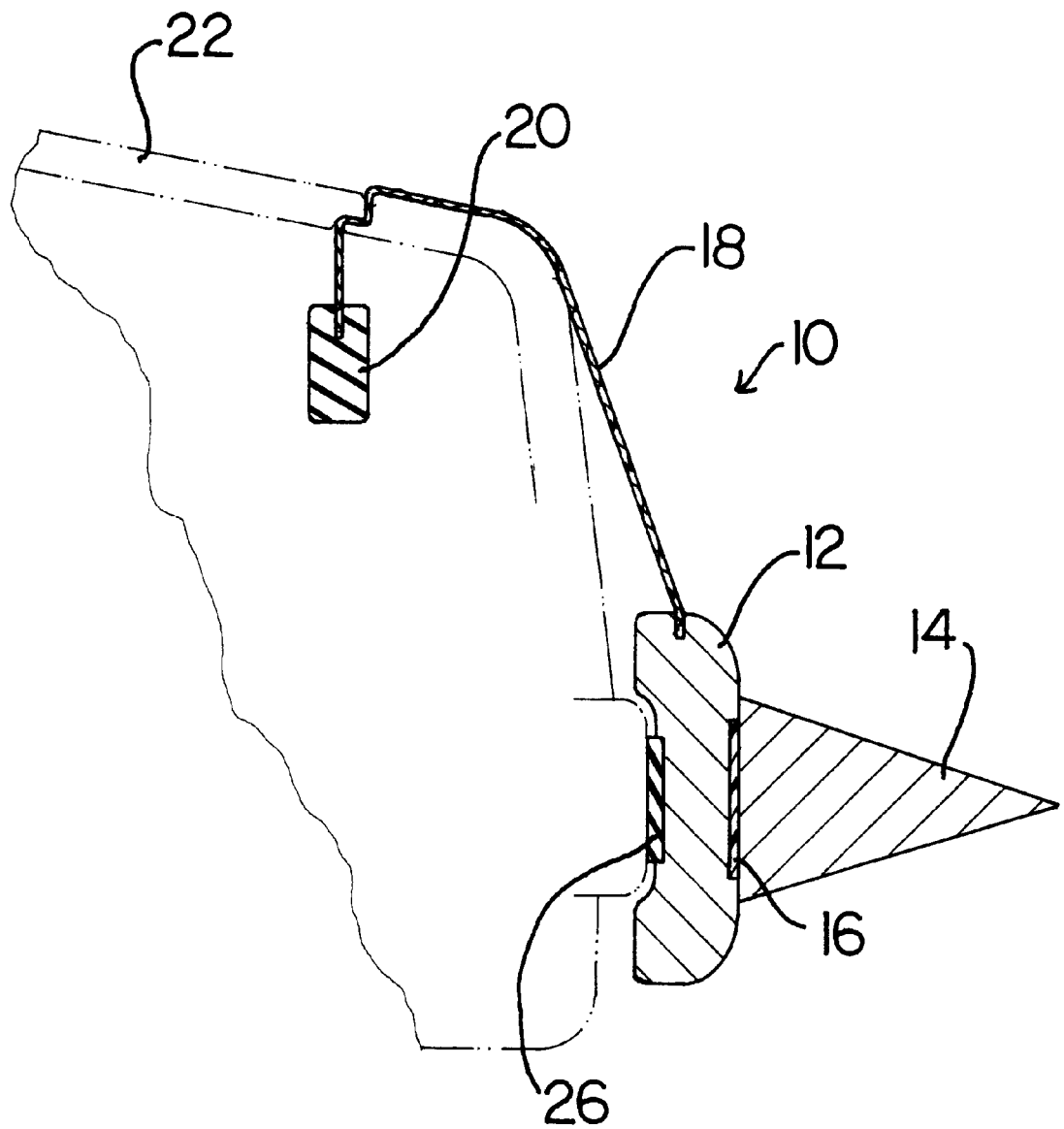
FIG. 3 is a side sectional view of the bumper protection device of the present invention.

Referring now to the drawings, and particularly to FIGS. 1–4, a current embodiment of the bumper protection device of the present invention is shown and generally designated by the reference numeral 10.

In FIG. 1, a new and improved bumper protection device 10 of the present invention for protecting a parked vehicle from damage caused by other vehicles attempting to park adjacent to it is illustrated and will be described. More particularly, the bumper protection device 10 has a base 12 made of plastic to which is attached two steel spikes 14, being conical in shape, and a reflective strip 16. Attached to the base 12 are two straps 18 made of nylon, which are attached at their other end to an anchor 20 made of plastic. The anchor 20 is attached to the parked vehicle 22, thereby attaching bumper protection device 10 to the parked vehicle 22. A parking vehicle 24 is also shown being deterred from touching parked vehicle 22 by the bumper protection device 10. Note that the broken lines illustrating parked vehicle 22 and parking vehicle 24 are for illustrative purposes only and are not part of the current invention.

Moving on to FIG. 2, a new and improved bumper protection device 10 of the present invention for protecting a parked vehicle from damage caused by other vehicles attempting to park adjacent to it is illustrated and will be described. More particularly, the bumper protection.. device 10 has a base 12 with a pair of spikes 14 and a reflective strip 16 attached to the top surface of base 12. Connected at one end to base 12 are straps 18, which connect at their other end to anchor 20.

Continuing with FIG. 3, a new and improved bumper protection device 10 of the present invention for protecting a parked vehicle from damage caused by other vehicles attempting to park adjacent to it is illustrated and will be described. More particularly, the bumper protection device 10 has a base 12. Attached to the top surface of base 12 is spike 14 and reflective strip 16. Attached to the bottom surface of base 12 is protective strip 26 made of rubber. Strap 18 is shown attached at one end to base 12 and at the other end to anchor 20. Anchor 20 is captured by parked vehicle 22, thereby securing the bumper protection device 10 to parked vehicle 22. Note that the broken lines illustrating parked vehicle 22 are for illustrative purposes only and are not part of the current invention.

Concluding with FIG. 4, a new and improved bumper protection device 10 of the present invention for protecting a parked vehicle from damage caused by other vehicles attempting to park adjacent to it is illustrated and will be described. More particularly, the bumper protection device 10 has a base 12. Attached to the top surface of base 12 are spikes 14 and reflective strip 16. Attached to the bottom surface of base 12 is protective strip 26. Straps 18 are also shown, attached at one end to base 12 and at their other end to anchor 20.

Figure 5:
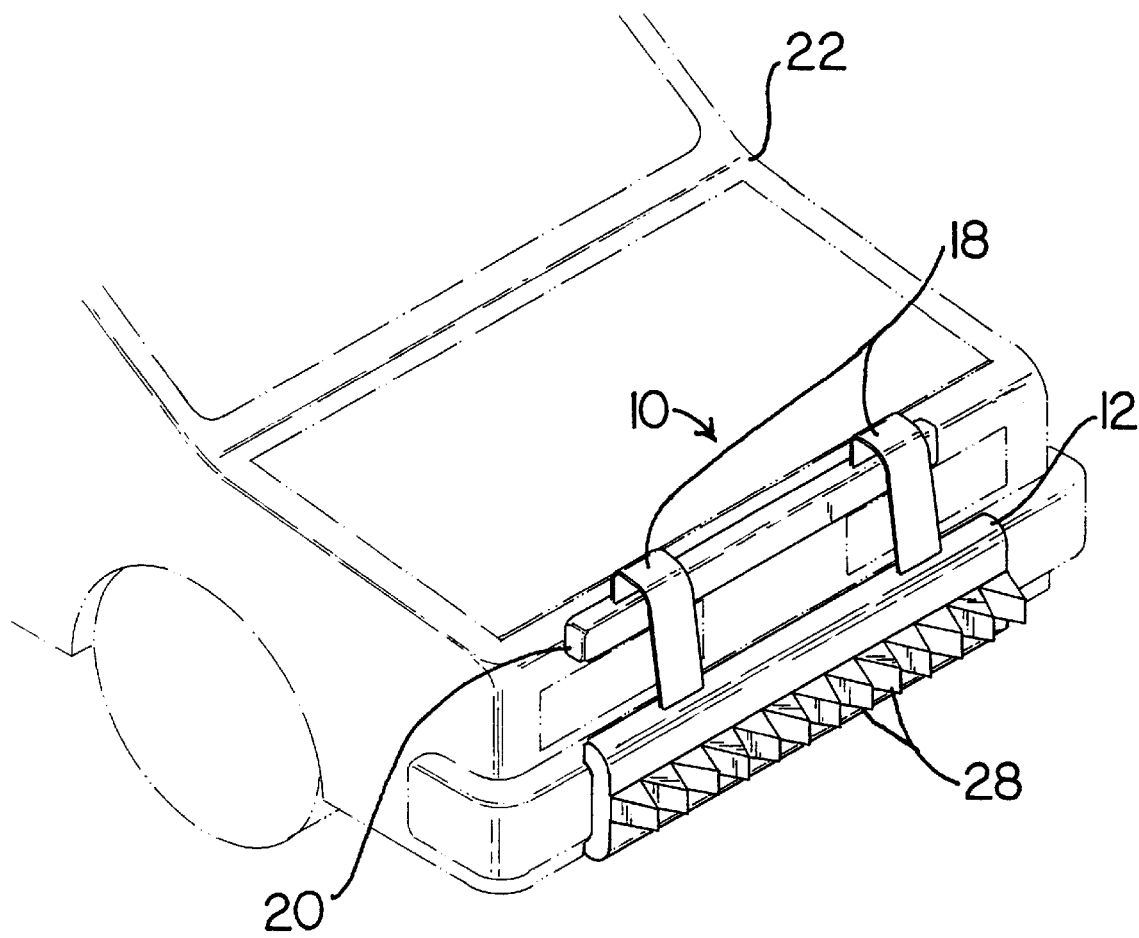
FIG. 5 is a front perspective sectional view of the current embodiment of the bumper protection device constructed in accordance with the principles of the present invention.

Now turning to FIG. 5, an alternative embodiment of the bumper protection device 10 of the present invention is illustrated and will be described. The bumper protection device 10 has a base 12 made of plastic to which is attached saw teeth 28, and a reflective strip 16. Attached to the base 12 are two straps 18 made of nylon, which are attached at their other end to an anchor 20 made of plastic. The anchor 20 is attached to the parked vehicle 22, thereby attaching bumper protection device 10 to the parked vehicle 22. A parking vehicle 24 is also shown being deterred from touching parked vehicle 22 by the bumper protection device 10. Note that the broken lines illustrating parked vehicle 22 are for illustrative purposes only and are not part of the current invention.

In use, it can now be understood that the anchor 12 is trapped within either the trunk or engine compartment of the parked vehicle 22 to provide a secure yet easily removable attachment point for the bumper protection device 10 to parked vehicle 22. Once it is affixed, a parking vehicle 24 is deterred from making contact with the front or the rear of parked vehicle 22 by bumper protection device 10 and its associated spikes 14.

While a current embodiment of the buper protection device has been described in detail, it should be apparent that modifications and variations thereto are possible, all of which fall within the true spirit and scope of the invention. With respect to the above description then, it is to be realized that the optimum dimensional relationships for the parts of the invention, to include variation in size, materials, shape , form function and manner of operation, assembly and use, are deemed readily apparent and obvious to on skilled in the art, and all equivalent relationships to those illustrated in the drawings and described in the specification are intended to be encompassed by the present invention. For example, any suitable sturdy material such as steel, aluminum, wood, titanium, or carbon fiber composite may be used instead of the plastic base and anchor described. Also, the steel spikes my also be made from plastic, metal-coated plastic, steel, aluminum, wood, titanium, or carbon fiber composite. The choice of spike composition is governed by the usage conditions, such as likelihood of contact with salt and whether or not the use desires the ability to actually damage the parking vehicle as opposed to merely providing a visual deterrent to contact. As illustrated by the alternative embodiment of FIG. 5, other types of deterrent devices could also e affixed to the base, such as bumps, pyramidal structures, or saw teeth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bumper protection device comprising:
   a base having a top surface and a bottom surface;
   one or more straps having opposing ends with one end attached to said base;
   an anchor attached to said opposing end of said strap;
   a reflective strip attached to said top surface of said base;
   a protective strip attached to said bottom surface of said base; and
   a contact deterrence device attached to said top surface of said base.

2. The contact deterrence device as defined in claim 1, wherein said deterrence device comprises one or more spikes.

3. The contact deterrence device as defined in claim 1, wherein said deterrence device comprises one or more saw teeth.

\* \* \* \* \*